United States Patent
Moulton, III (10) Patent No.: US 7,263,775 B2
(45) Date of Patent: Sep. 4, 2007

(54) ILLUMINATING NAIL CLIPPER

(76) Inventor: Reynolds E. Moulton, III, 105 E. 63rd, Apt. 5B, New York, NY (US) 10021

( * ) Notice: Subject to any disclaimer, the term of this patent is extended or adjusted under 35 U.S.C. 154(b) by 0 days.

(21) Appl. No.: 10/890,868

(22) Filed: Jul. 15, 2004

(65) Prior Publication Data

US 2005/0210679 A1    Sep. 29, 2005

Related U.S. Application Data

(63) Continuation-in-part of application No. 10/807,928, filed on Mar. 24, 2004, now abandoned.

(51) Int. Cl.
*A01K 13/00* (2006.01)
*B26B 13/22* (2006.01)
*A45D 29/00* (2006.01)

(52) U.S. Cl. .................... 30/29; 30/26; 30/123; 30/242; 30/254; 30/278; 7/162; 119/600; 362/119

(58) Field of Classification Search .............. 30/26–29, 30/123, 241–243, 254, 278, 34.05; 7/162; 119/600, 601; 132/73, 73.5, 75.3, 75.4, 75.5; 362/119, 120, 577, 115; 310/47, 73
See application file for complete search history.

(56) References Cited

U.S. PATENT DOCUMENTS

| | | |
|---|---|---|
| 165,402 A | 7/1875 | Bates |
| 205,088 A | 6/1878 | Hollman |
| 1,347,651 A | 7/1920 | Nauth |
| 1,927,234 A | 9/1933 | Hawkins ..................... 128/306 |
| 2,820,292 A | 1/1958 | Bouten et al. ................. 30/182 |
| 2,955,354 A | 10/1960 | Laing .............................. 30/29 |
| 3,101,535 A | 8/1963 | Andis ......................... 30/29.5 |
| 3,299,505 A | 1/1967 | Pionek ............................ 30/29 |
| 3,430,340 A | 3/1969 | Perles ............................. 30/28 |
| 3,838,507 A | 10/1974 | Clark ............................. 30/29 |
| 3,845,553 A | 11/1974 | Fields ............................ 30/29 |
| 3,855,699 A | 12/1974 | Charlett ........................ 30/135 |
| 3,903,596 A | 9/1975 | Crosby ........................... 30/29 |
| 3,943,947 A | 3/1976 | Voll .............................. 132/73 |
| 3,943,948 A * | 3/1976 | Sartore ......................... 132/73 |
| 4,228,585 A | 10/1980 | Nelson ........................... 30/29 |
| D260,308 S | 8/1981 | Suchowski ................... D30/40 |
| 4,449,297 A | 5/1984 | Fuchs et al. .................... 30/29 |
| 4,856,190 A | 8/1989 | Reiswig .......................... 30/29 |
| 4,956,915 A | 9/1990 | Anderson ....................... 30/28 |
| 5,065,513 A | 11/1991 | Reiswig .......................... 30/29 |
| 5,101,563 A | 4/1992 | D'Orgelys ...................... 30/28 |

(Continued)

*Primary Examiner*—Clark F. Dexter
(74) *Attorney, Agent, or Firm*—Klaus P. Stoffel; Wolff & Samson PC (57) ABSTRACT

An illuminating nail clipper for clipping the nails of an animal such as a dog, cat, bird, or the like which allows for the clipping of an individual nail at the desired length to prevent injury or improper length cutting for the animal. The device includes a hand-actuated clipping blade used in conjunction with an adjustable in size nail holder which includes a cutting hole and which allows the nail to be clipped to be firmly held at a particular position relative to the nail cutting blade. A light source illuminates an animal's nail to make it translucent, allowing the operator to see the capillaries within the nail and thus to avoid cutting to the live portion of the nail.

20 Claims, 7 Drawing Sheets

U.S. PATENT DOCUMENTS

| | | | |
|---|---|---|---|
| 5,117,847 A * | 6/1992 | May | 132/75.5 |
| 5,123,430 A | 6/1992 | Davidovitz | 132/75.8 |
| 5,533,262 A | 7/1996 | Clark | 30/29 |
| 5,546,658 A * | 8/1996 | MacLeod et al. | 30/28 |
| 5,640,770 A | 6/1997 | Fowler | 30/29 |
| 6,220,251 B1 | 4/2001 | Jeong et al. | 132/73.5 |
| 6,523,545 B2 | 2/2003 | Rende | 132/75.5 |
| 6,553,592 B2 * | 4/2003 | Yang et al. | 7/162 |
| 6,601,587 B2 * | 8/2003 | Shaw | 132/75.3 |
| 2002/0178585 A1 * | 12/2002 | Yang et al. | 30/28 |
| 2003/0010349 A1 * | 1/2003 | Rende | 132/75 |
| 2003/0094183 A1 * | 5/2003 | Shaw | 132/75.3 |
| 2004/0123875 A1 * | 7/2004 | Kim | 132/73.5 |

* cited by examiner

ILLUMINATING NAIL CLIPPER

CROSS-REFERENCES TO RELATED APPLICATIONS

This application is a Continuation-In-Part of U.S. patent application Ser. No. 10/807,928 filed on Mar. 24, 2004, now abandoned, the entire contents of which are herein incorporated fully by reference thereto.

TECHNICAL FIELD

This invention relates to instruments useful in the grooming and maintenance of animals. More particularly, it relates to an improved nail clipper useful in controlling the length of keratinous growths, including without limitation nails and claws on dogs and cats, and talons of various birds.

BACKGROUND

Professional quality animal nail clippers used by both veterinarians and animal owners in trimming the nails of animals, such as those of dogs and cats, have been successfully made and sold for over forty years under the trademark "RESCO" by Tecla Company, Incorporated of Walled Lake, Mich. Such clippers were initially made in accordance with the principles and features of the Laing U.S. Pat. No. 2,955,354 and later pursuant to the improvements of the Clark U.S. Pat No. 3,838,507, both incorporated herein by reference. More recently a nail clipper of this type has been successfully modified for use in clipping human artificial fingernails by employing the principles and features of the Reiswig U.S. Pat. No. 4,856,190, also incorporated herein by reference. Other prior art patents of general interest directed to guillotine-type cutters and clippers are disclosed in the following U.S. patents, the entirety of all of which are herein incorporated by reference: 165,402; 205,088; 1,347,651; 1,927,234; 2,820,292; [2,955,354;] 3,101,535; 3,299,505; 3,430,340; [3,838,507;] 3,845,553; 3,855,699; 3,903,596; 4,228,585; 4,228,585; 4,449,297; [4,856,190;] 5,065,513; 5,101,563; 5,123,430; and 5,533,363 all of which are herein incorporated by reference.

During the course of the use of a nail clipper of the prior art, the groomer typically locates the cutting jaws, blades or other cutting means about the nail which is desired to be trimmed, and actuates the cutting mechanism of the clipper, often by squeezing the handles on the clipper device. However, the nail includes not only the dead portion which is desired to be trimmed off of the animal, but also includes a live root portion from which the nail grows, which root portion includes various tissues, including blood vessels and nerves. Owing to the variability across species of the amount which the root protrudes from the limb of the animal, it is not uncommon during a nail trimming procedure for the groomer to inadvertently cut into the root portion, causing pain to the animal, in addition to bleeding and the possibility of infection of the wound so created, which is an inherent disadvantage in the prior art. Nails, claws and talons are examples of keratinous growths.

Thus, it is an object of the present invention to alleviate and eliminate the cutting into the root or the "quick" of a nail during a nail trimming procedure, with the "quick" being the nerve bundle and blood supply capillaries. It is a further object of the invention to provide a nail clipping tool through the use of which it is possible to alleviate and eliminate the cutting into the root of a nail during a nail trimming procedure. It is also an object of the invention to provide a nail clipper meeting the aforesaid objects, which is ergonomical to the user. These and other objects satisfied by the present invention shall become apparent from the disclosure which follows.

SUMMARY OF THE INVENTION

The present invention provides a device useful for cutting items needing to be trimmed, including nails, claws and talons of various animal and bird species. A device according to one form of the invention comprises a first handle means and a second handle means, wherein the first handle means and the second handle means are pivotally connected to one another. There is a cutting tang portion including a hole therethrough into which an item to be trimmed may be disposed. There is a housing portion inside which is contained a means for effecting cutting of the item when disposed in the hole, wherein the means for effecting cutting is in effective mechanical contact with the first handle means and the second handle means. There is a flexibly orientable means for illumination comprising a flexible conduit having a first end portion and a second end portion, wherein the first end portion of the flexible conduit is attached to the device at a location selected from the group consisting of: the housing portion, the upper first handle, and the lower second handle, and wherein the second end portion of the flexible conduit comprises a lamp head in which is disposed a lamp means. There is an electrical storage battery having a positive pole and a negative pole, wherein the positive pole and the negative pole are in effective electrical contact with the lamp means to cause the lamp means to be illuminated.

The invention further comprises a process for cutting a keratinous growth including nails, claws and talons of a mammalian or avian species which comprises the steps of: a) impinging a source of light having sufficient intensity on the keratinous growth to render the keratinous growth translucent; and b) positioning a cutting device in a desired position on the keratinous growth; and c) cutting the keratinous growth in a selected location.

DETAILED DESCRIPTION

Figure 1:
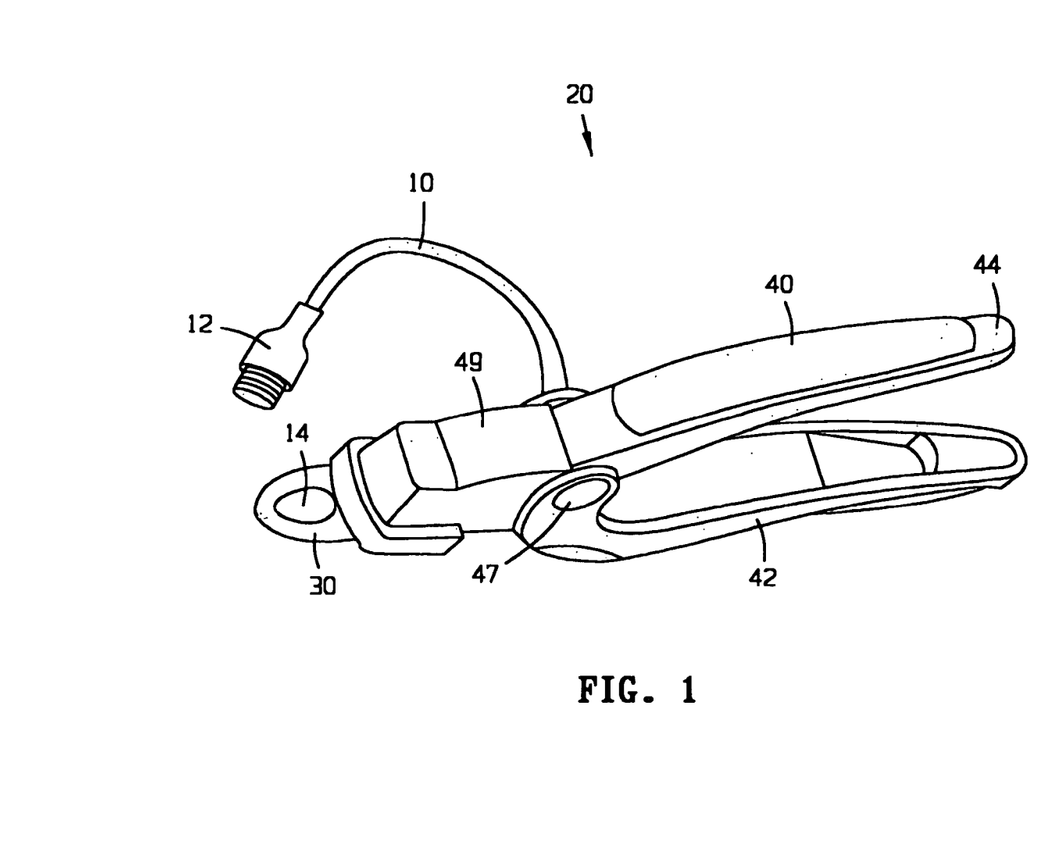
FIG. 1 shows a perspective view of a nail clipper according to the present invention.

Referring to the drawings and initially to FIG. 1 there is shown a perspective view of a nail clipper 20 according to the present invention. In this FIG. 1 there is shown an first handle means 44 and a second handle means 42 which are pivotally connected to one another at the pivot point 47 by means of a conventional fastener, such as a rivet, hinge pin, or the like. There is a cutting tang 30 which includes a cutting zone or hole 14 into which zone 14 a nail, claw, or talon, etc. which is desired to be cut or trimmed may be disposed prior to trimming. There is also a housing portion 49 inside of which is contained a mechanical means for effecting cutting of an item when disposed in the cutting zone 14, wherein the means for effecting cutting is in effective mechanical contact with the first handle means and the second handle means. The housing portion may be open to the exterior surroundings, or may be closed thereto by virtue of its construction.

A device according to the invention may include any means for effecting cutting of an item desired to be cut (nails, claws, talons, etc.) contained in any of the prior art references herein incorporated by reference in the foregoing background section, which references are also incorporated into this Detailed Description. Thus, the words "cutting means" as used in this specification and the claims appended hereto includes any and all of such prior art mechanisms for effecting cutting of an item desired to be cut which is disposed in the cutting zone 14 of the cutting tang 30 including those specifically described herein. This includes those mechanisms adapted for use in cutting devices which are configured to be held and used by a single hand of a person operating the device, which device comprises two handle portions that effect a cutting by the handle portions being squeezed together.

In FIG. 1 there is also shown a flexible conduit 10. In one preferred form of the invention, flexible conduit 10 comprises a first end portion and a second end portion, wherein the first end portion is attached to the device at a location selected from the group consisting of: the housing portion, the upper handle, and the lower handle, by conventional means of attachment. The second end portion of the flexible conduit 10 comprises a lamp head 12 in which is disposed a lamp means (51, FIG. 4). In addition, there may optionally be a handle grip 40 disposed on the external surface of the first handle means 44. The handle grip 40 increases comfort in use by being contoured to fit the contours of the hand of the user, and may be made from any material; however soft polymers are preferred, such as semi-crystalline polypropylenes, EP rubbers, and various other thermoset resins known in the art for having a pleasing feel to the touch. The flexible conduit 10 may be attached to a nail clipper according to the present invention by any conventional means, such as by welding, adhesives, screws, rivets, crimping, or other fastening means known in the art. Similarly, the lamp head 12 may be attached to the flexible conduit 10 of a nail clipper 20 according to the present invention by any conventional means, such as by welding, adhesives, screws, rivets, crimping, clamps, or other fastening means known in the art.

Figure 2:
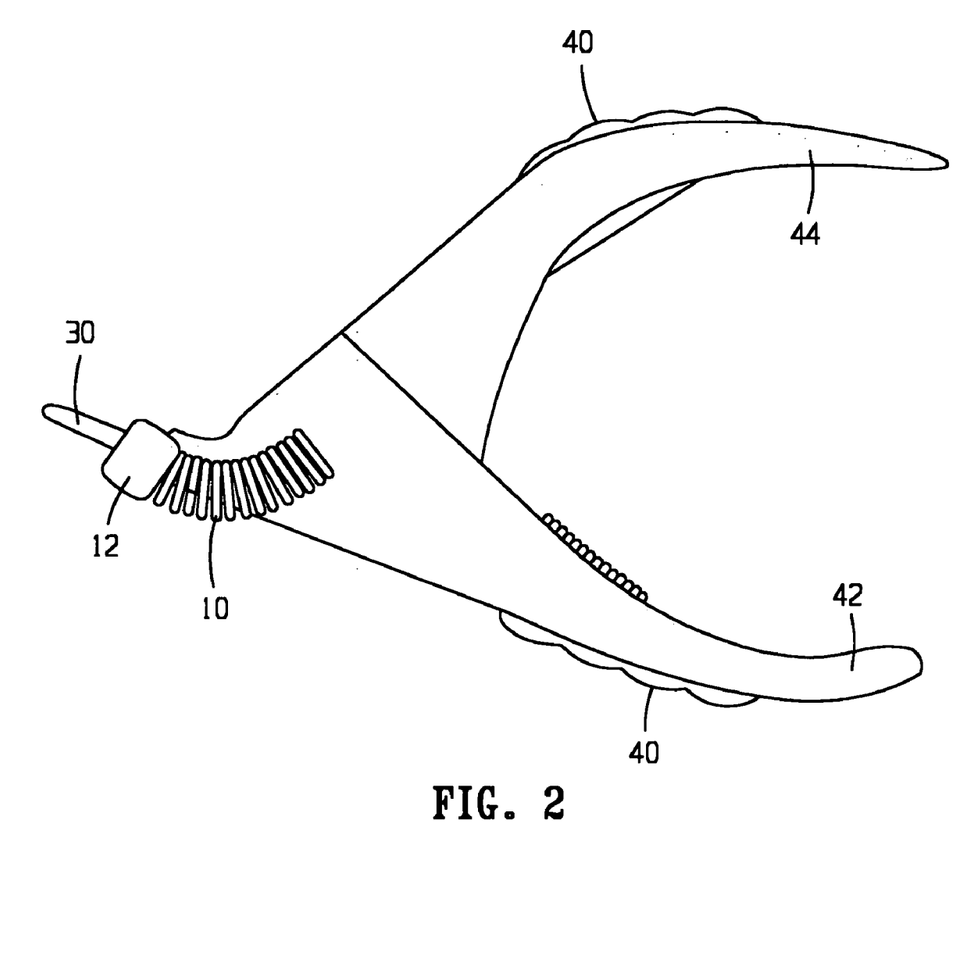
FIG. 2 shows a side view of a nail clipper according to the present invention.

FIG. 2 shows a side view of a nail clipper according to the present invention, showing the respective positions of the cutting tang 30, flexible conduit 10, lamp head 12, first handle means 44, second handle means 42 and handle grips 40.

Figure 3:
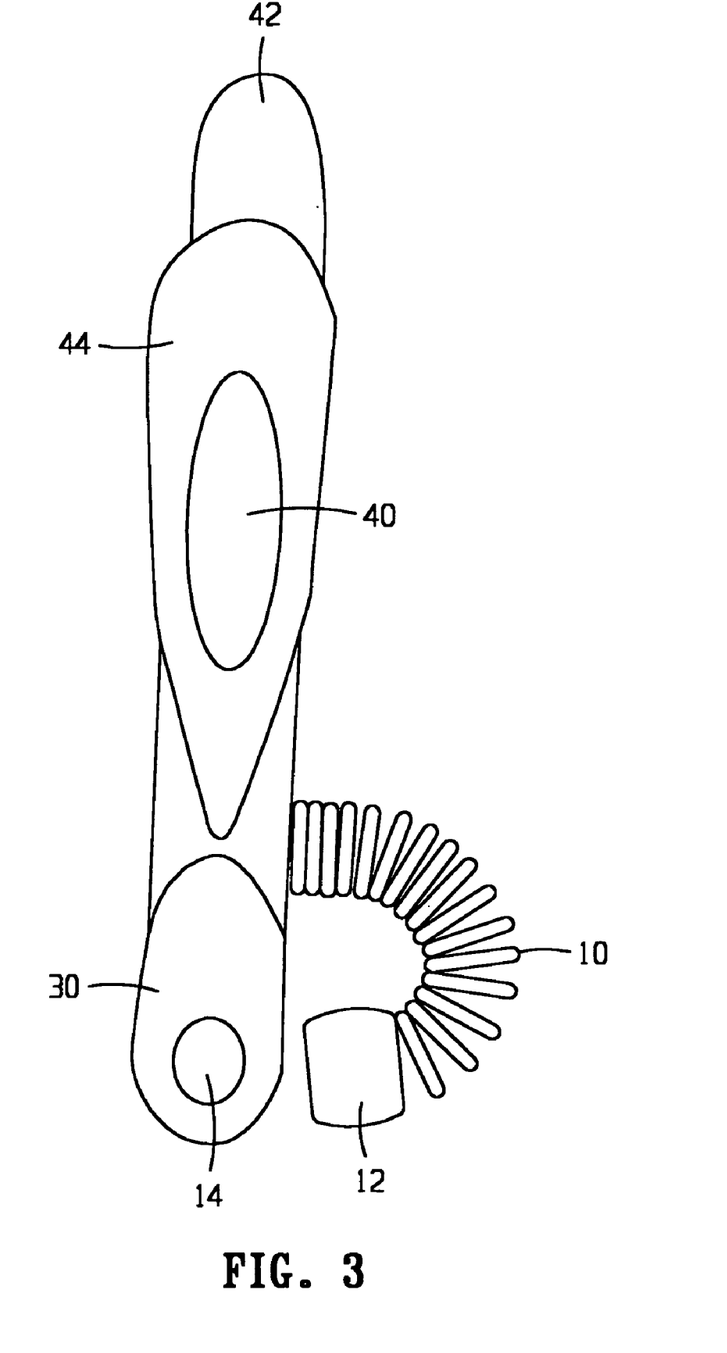
FIG. 3 shows an overhead view of a nail clipper according to the present invention.

FIG. 3 shows a side view of a nail clipper according to the present invention, showing the respective positions of the cutting tang 30 having a cutting hole or zone 14 disposed therethrough, flexible conduit 10, lamp head 12, first handle means 44, second handle means 42 and handle grips 40.

Figure 4:
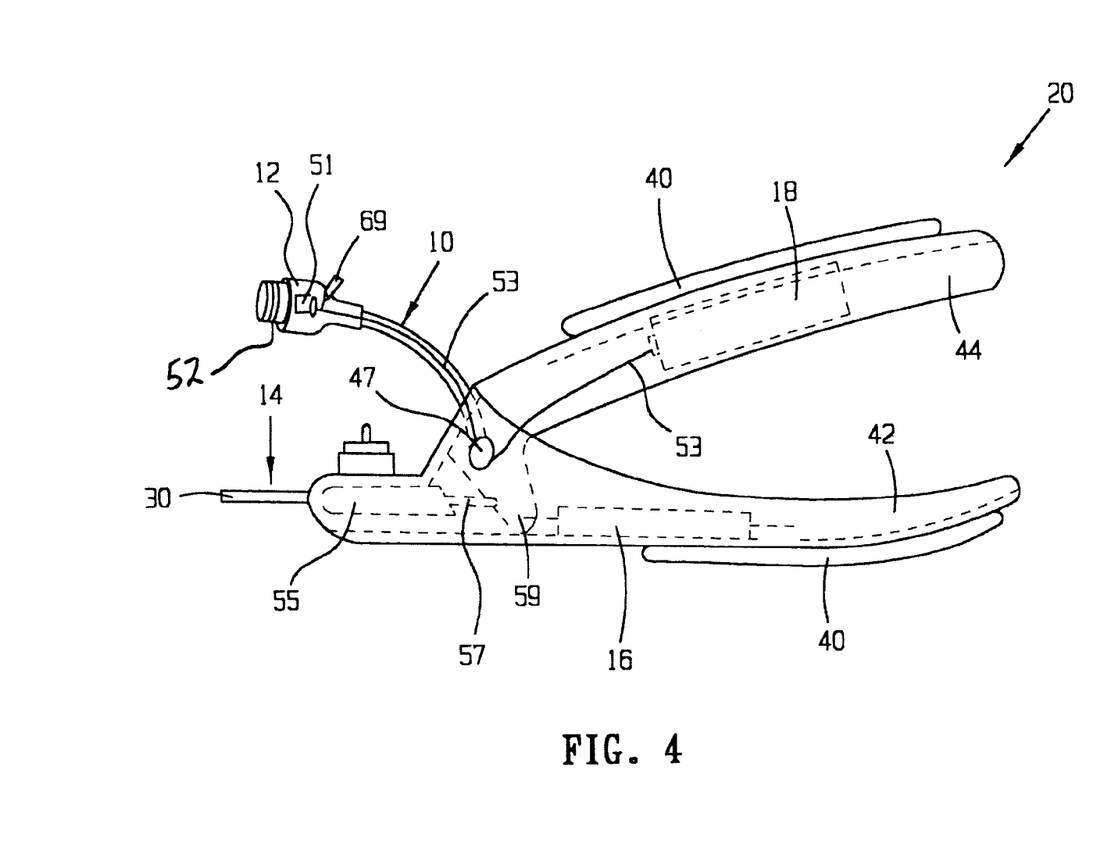
FIG. 4 shows a side view of a nail clipper according to an alternate form of the present invention.

In FIG. 4 is shown a side section view of a nail clipper 20 according to an alternate form of the present invention. In this figure are shown the respective positions of the cutting tang 30, flexible conduit 10, lamp head 12, first handle means 44, second handle means 42, handle grips 40, lamp means 51, wire 53, battery 18, level tang 59, spring 16, blade means 55 and link 57. This figure shows how in one embodiment the first handle means 44 and the second handle means 42 cooperatively function to cause the blade means 55 to move laterally about the hole 14. By squeezing the handle means 44 and 42 together, the lever tang 59 moves the blade means 55 across the cutting hole 14 by virtue of the lever tang 59 and blade means 55 being connected to one another by means of the link 57. Spring 16 has a first end portion which is anchored to the second handle means 42 and a second end portion which is in contact with the lever tang 59, so that when the handle means are released, the spring pulls back on the lever tang 59 to cause the handles to open up with respect to one another while simultaneously pulling the blade means 55 back to its original position, and such mechanisms are generally known in the art.

In FIG. 4 is also shown the battery 18 in effective electrical contact with the lamp means 51 via wire 53, which is disposed through the flexible conduit 10. The wire 53 maybe single conductor, or multiple conductor, and in one embodiment of the invention the chassis of the device, which includes the handle means, is fabricated from a metallic material such as steel which enables the handle means to function as one of the wires of contact between the battery and the lamp means, thus permitting wire 53 to be a single conductor. In an alternative form of the invention, the handle means are non-conductive, and a second wire is utilized. In one preferred embodiment, there is an electrical switch means 69 disposed on the lamp head 12 whose function is to enable the user to selectively complete and disrupt the circuit, as desired, to turn the lamp on or off; however, the switch means (either single pole or double pole) 69 may be disposed anywhere on the device 20. In a preferred embodiment, the lamp means 51 is an incandescent lamp, operating at a voltage of about 1.5 volts or less, and the battery is a size AA dry cell battery. In an alternate form of the invention, the battery 18 is a rechargeable battery selected from the group consisting of: nickel metal hydride batteries, nickel cadmium batteries, lithium batteries, and lithium ion batteries; however, any re-chargeable cell is suitable for use in the present invention. According to preferred embodiments of the invention, the battery 18 is of such size dimensions that it resides onboard of a device according to the present invention.

Figure 5:
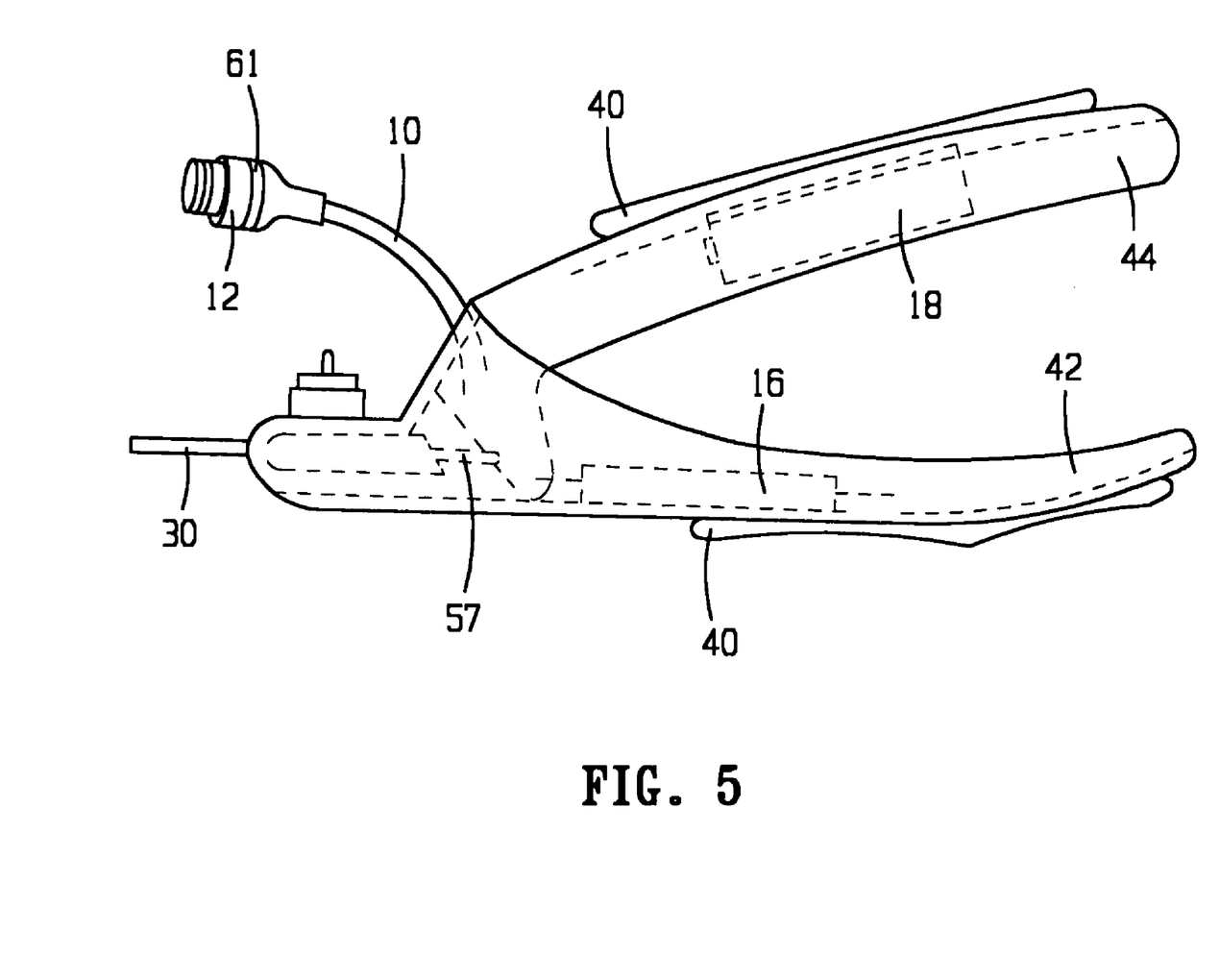
FIG. 5 shows a side view of a nail clipper according to an alternate embodiment of the present invention.

FIG. 5 shows a side cutaway view of a nail clipper 20 according to an alternate embodiment of the present invention in which the battery means 61 is a compact battery such as the type used in wrist watches and other consumer devices requiring a compact source of electricity. In this embodiment, the battery 61 is disposed in the lamp head itself. Thus, it is seen that the present invention uses an electrical storage means (battery) to power the lamp means. In a preferred form of the invention, the battery 18 is affixed to the first handle means 44. In an alternative for of the invention, the battery 18 may be affixed to the second handle means 42. In either of these embodiments, the handle portion itself may be configured during fabrication to contain a space into which the battery may be housed. In this FIG. 5 are also shown the flexible conduit 10, first handle means 44, second handle means 42, handle grips 40, spring 16, blade means 55, lever tang 59, and link 57, which is a tiny rod or stiff wire. In this embodiment, the handle grips 40 are shown to be contoured to match the contours of the human hand.

The flexible conduit means 10 may be comprised of any material which is rigid enough to maintain the lamp head in any position selected by the user, so as to enable the direction of the light emitted from the lamp head to be oriented in any desired direction. However, the flexible conduit means 10 must also be flexible enough to be bent, straightened, and otherwise shaped as desired. Towards such end, the flexible conduit used by Black & Decker company in the manufacture of its SNAKELIGHT™ flashlight is but one example of a type of conduit means suitable for use in the present invention. Another suitable material useful as the conduit means is a plastic coated metallic tubing which is comprised of a plurality of interlocking annular elements which are reminiscent of scales. The conduit means in one form of the invention is hollow, to enable passage of the wire 53 therethrough. In other embodiments, such as where the battery means is contained within the lamp head, the flexible conduit does not necessarily need to be provided with a hollow interior space through which a wire can be passed, as the wire can be on the outside of the flexible conduit. The flexible conduit means 10 may be as simple as comprising a hollow tube or wire. In addition, the lamp head 12 may include one or more lenses useful for adjustably focusing the light beam emitted from the lamp means 51, to focus the light beam at a point at a desired distance from the lamp head 12, as the use of such a lens or lenses for this purpose is known in the art, one example of which is utilized in the MAG-LILTE® flashlights available from MAG INSTRUMENT of Ontario, Calif. The various lamps, flashlights, and the like herein described, including their functional equivalents, are conveniently referred to as means for illumination.

Figure 6:
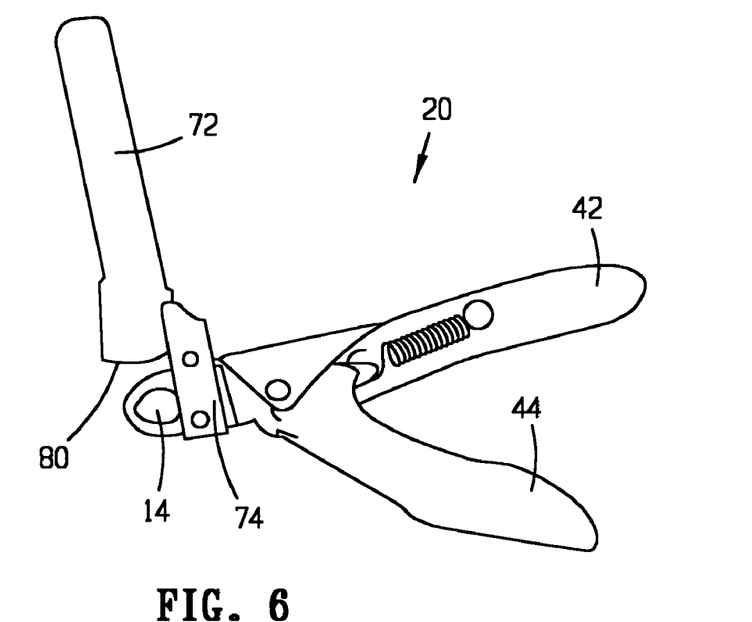
FIG. 6 shows a side view of a nail clipper according to an alternate embodiment of the present invention.

An alternative form of the invention is shown in FIG. 6, which comprises a means for illumination 72 having a portion from which light is emitted 80, which means for illumination is rigidly affixed to the clipping device 20 using a conventional fastening means, such as a bracket 74 which is affixed to both the means for illumination and any selected portion of the cutting device. In this embodiment are also shown the first handle means 44, second handle means 42, and cutting zone 14.

Figure 7:
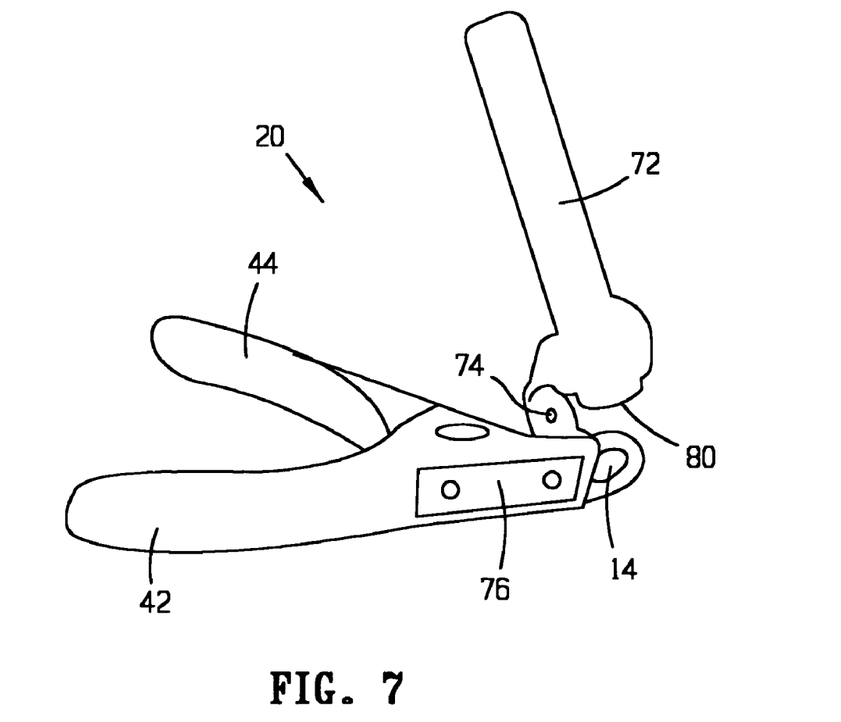
FIG. 7 shows a side view of a nail clipper according to an alternate embodiment of the present invention.

Another view of an alternative form of the invention is shown in FIG. 7, which guillotine-type device 20 comprises a means for illumination 72 having a portion from which light is emitted 80, which means for illumination is rigidly affixed to the clipping device 20 using a conventional fastening means, such as a bracket 74 which is affixed to both the means for illumination and any selected portion of the cutting device. In this embodiment are also shown the first handle means 44, second handle means 42, and cutting zone 14. In the alternative embodiment of FIG. 7 it is also seen that there is provided a conventional filing means 76 disposed on a surface of the cutting device using conventional attachment means such as screws, adhesives, rivets, etc., which filing means 76 is useful for filing sharp edges, nails, claws, and talons produced during a cutting operation. The filing means 76 in this and alternate equivalent devices may be metallic, as in common shop files, or may comprise a granular substance such as sand adhesively disposed on a backing, such as in the case of common sandpaper.

Figure 8:
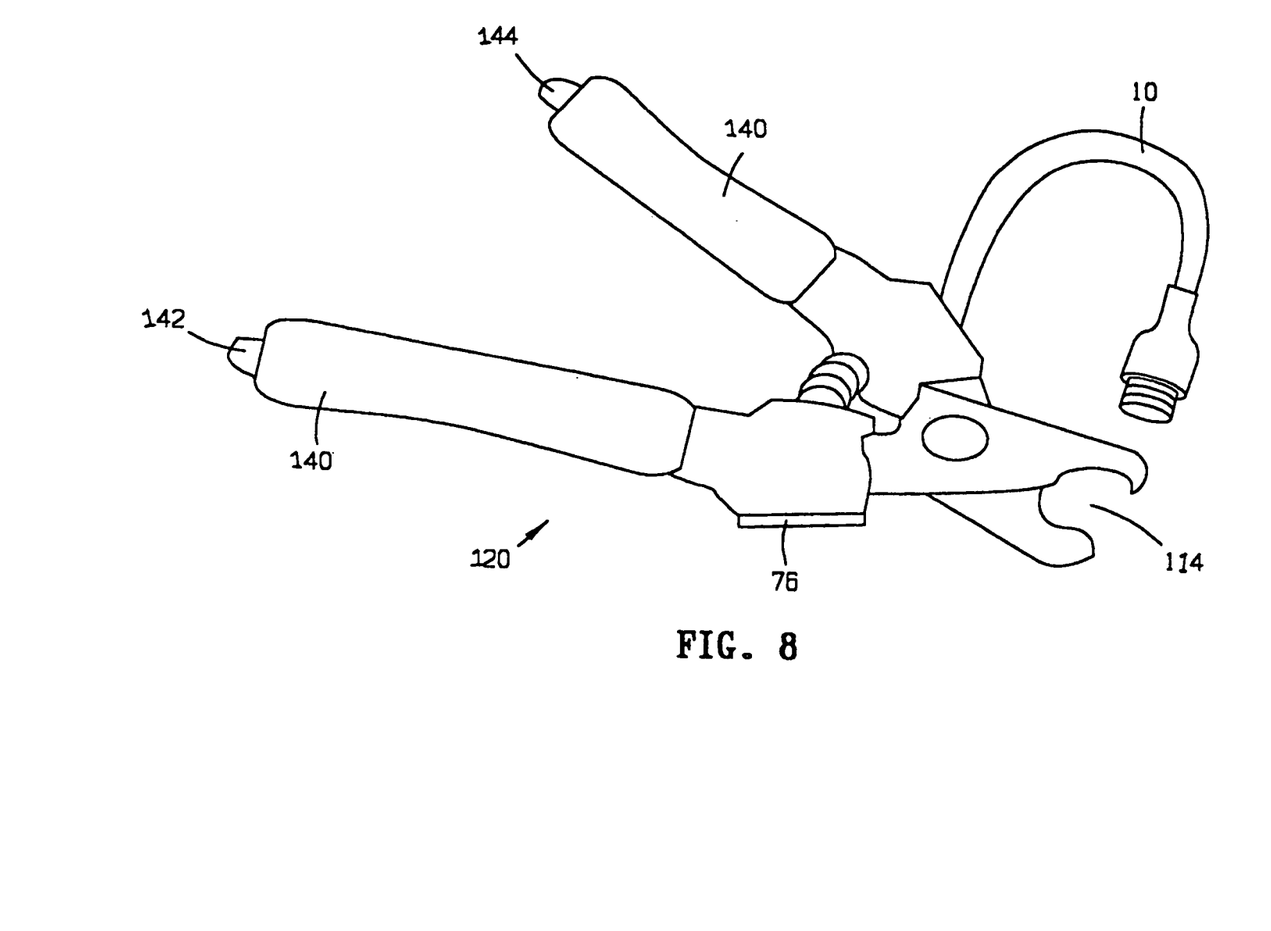
FIG. 8 shows a side view of a nail clipper according to an alternate embodiment of the present invention.

Another alternative form of the invention is shown in FIG. 8, which scissors-type device 120 comprises a means for illumination that comprises a flexible conduit 10. In this embodiment are also shown the first handle means 144, second handle means 142 and cutting zone 114, the first and second handle means each having a handle grip 140 thereon. In the alternative embodiment of FIG. 8 it is also seen that there is provided a conventional filing means 76 disposed on a surface of the cutting device, using conventional attachment means such as screws, adhesives, rivets, etc.

A clipping device according to the invention may be comprised of any material, including various metals, polymers, composites, etc. and may also further include features which enable the blade means 55 to be changed or removed from the device, as the use of removable and switchable blades are known in the art.

Consideration must be given to the fact that although this invention has been described and disclosed in relation to certain preferred embodiments, obvious equivalent modifications and alterations thereof will become apparent to one of ordinary skill in this art after reading and understanding this specification and the claims appended hereto. The present invention includes the subject matter defined by any combination of any one of the various claims appended hereto with any one or more of the remaining claims, including the incorporation of the features of any dependent claim, singly or in combination with other dependent claims into any independent claim, either alone or in combination with the features or limitations of any other independent claim, with the remaining dependent claims in their original text being read and applied to any independent claim so modified. The present invention further includes all possible combinations of the features recited or incorporated by reference in the specification and/or any one of the various claims appended hereto, and alternatively as modified per the foregoing, with any of the features recited elsewhere in the specification or incorporated by reference and/or in any one or more of each of the remaining claims. Accordingly, the presently disclosed invention is intended to cover all such modifications, alterations, and combinations.

I claim:

1. A cutting device comprising:
   a) a cutting zone into which an item to be trimmed may be disposed;
   b) a guillotine-type cutting means for cutting said item placed into said cutting zone;
   c) an upper handle means and a lower handle means for operating said guillotine-type cutting means, said upper and lower handle means cooperatively connected to one another to operate said guillotine-type cutting means and effect a cutting of said item placed into said cutting zone when said handle means are squeezed together, said upper and lower handle means having a common laterally extending pivot axis; and
   d) a means for illumination of said cutting zone, said means for illumination coupled to at least one of said upper handle means and said lower handle means so as to extend substantially laterally from the upper and lower handle means along the pivot axis and capable of simultaneously being positioned substantially laterally from said cutting zone, said means for illumination further capable of being moved with respect to said cutting zone in three dimensions so as to illuminate the cutting zone from selected angles.

2. A cutting deice according to claim 1 wherein said means for illumination is oriented so as to effectively provide illumination to a portion of said item to be trimmed, when said item to be trimmed is disposed in said cutting zone.

3. A cutting device according to claim 1 wherein at least a portion of said cutting means is contained inside a housing portion, said cutting means in effective mechanical contact with at least one of said upper handle means and said lower handle means.

4. A cutting device according to claim 1 wherein at least one of said upper handle means and said lower handle means is adapted to receive an electrical storage battery.

5. A cutting device according to claim 1 wherein said cutting means includes a blade portion which is disposed to move laterally over a hole when said upper handle and said lower handle are squeezed together.

6. A cutting device according to claim 1 wherein said means for illumination comprises and incandescent lamp.

7. A cutting device according to claim 1 wherein said means for illumination comprises a lamp head.

8. A cutting device according to claim 7 wherein said lamp head is selectively focusable.

9. A cutting device according to claim 7 further comprising an electrical storage battery disposed inside of said lamp head.

10. A device according to claim 9 wherein said battery is selected from the group consisting of: chargeable batteries and dry cells.

11. A device according to claim 1 wherein at least one of said upper handle means and said lower handle means includes an ergonomic handle grip disposed on its exterior surface.

12. A device according to claim 11 wherein said handle grip is contoured to fit the inside of the human hand.

13. A cutting deice according to claim 1 wherein said means for illumination includes a flexible conduit.

14. A cutting device according to claim 13 wherein said flexible conduit has a first end portion and a second end portion, said first end portion of said flexible conduit attached to at least one of the group of said upper handle means and said lower handle means, said second end portion of said flexible conduit comprising a lamp head in which is disposed a lamp means.

15. A cutting device according to claim 13, further comprising a housing portion, inside of which housing portion is contained at least a portion of said guillotine-type cutting means, said guillotine-type cutting means in effective mechanical contact with at least one of said upper handle means and said lower handle means.

16. A cutting device according to claim 15 wherein said flexible conduit has a first end portion and a second end portion, first end portion of said flexible conduit attached to at least one of the group of said upper handle means and said lower handle means, said second end portion of said flexible conduit coupled to a lamp head.

17. A cutting device comprising:
a cutting zone;
a cutting means, said cutting means comprising a slidable blade, a cutting tang, and a lever tang;
a first handle and a second handle connected to said cutting means, said first handle and said second handle cooperatively connected to one another to actuate said lever tang and said slidable blade across said cutting zone towards said cutting tang and effect a cutting of an item placed into said cutting zone when said first handle and said second handle are squeezed together, said first handle and said second handle being pivotable about a common laterally extending pivot axis; and
a means for illumination of said cutting zone, said means for illumination coupled to at least one of said first handle and second handle so as to extend substantially laterally from the handles along the pivot axis and capable of simultaneously being positioned substantially laterally from said cutting zone, said means for illumination further capable of being moved with respect to said cutting zone in three dimensions so as to illuminate the cutting zone from selected angles.

18. The cutting device of claim 17 wherein said means for illumination comprises a flexible conduit having a first end portion and a second end portion, said first end portion is attached to at least one of the group of said first handle and said second handle, said second end portion comprises a lamp head.

19. The cutting device of claim 18 wherein said cutting zone is substantially circular.

20. The cutting device of claim 17 wherein said means for illumination is rigidly fixed with respect to its orientation relative to said cutting tang.

* * * * *